(12) United States Patent
Gupta

(10) Patent No.: US 11,074,489 B1
(45) Date of Patent: Jul. 27, 2021

(54) DUAL COMMUNICATION CHANNEL SMART CARD

(71) Applicant: Bank of America Corporation, Charlotte, NC (US)

(72) Inventor: Saurabh Gupta, New Dehli (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/879,866

(22) Filed: May 21, 2020

(51) Int. Cl.
| | |
|---|---|
| *G06K 19/06* | (2006.01) |
| *G06K 19/07* | (2006.01) |
| *G07F 19/00* | (2006.01) |
| *G06Q 20/34* | (2012.01) |
| *G06K 19/077* | (2006.01) |

(52) U.S. Cl.
CPC ... *G06K 19/0724* (2013.01); *G06K 19/07707* (2013.01); *G06K 19/07709* (2013.01); *G06K 19/07711* (2013.01); *G06Q 20/341* (2013.01); *G06Q 20/3563* (2013.01); *G07F 19/206* (2013.01)

(58) Field of Classification Search
CPC ......... G06K 19/0724; G06K 19/07709; G06K 19/07711
USPC ........................................................ 235/492
See application file for complete search history.

(56) References Cited

U.S. PATENT DOCUMENTS

| | | | |
|---|---|---|---|
| 9,864,944 B2 | 1/2018 | Radu et al. | |
| 10,311,414 B1 * | 6/2019 | Mossoba | G07F 7/125 |
| 10,601,232 B1 * | 3/2020 | Wurmfeld | H02J 50/12 |
| 2013/0299592 A1 * | 11/2013 | Chiang | G06K 19/07309 |
| | | | 235/492 |
| 2014/0339315 A1 * | 11/2014 | Ko | G06Q 20/3227 |
| | | | 235/492 |
| 2017/0213120 A1 * | 7/2017 | Bae | G06F 3/0488 |
| 2017/0330173 A1 * | 11/2017 | Woo | G06K 19/07354 |
| 2019/0286805 A1 | 9/2019 | Law et al. | |

* cited by examiner

*Primary Examiner* — Ahshik Kim
(74) *Attorney, Agent, or Firm* — Weiss & Arons LLP; Michael A. Springs, Esq.

(57) ABSTRACT

Wait times at ATMs may undermine the utility of these self-service machines. ATMs are configured to provide faster self-service kiosks that allow users to quickly perform common financial transactions. However, it has been increasing common for users to have to wait on a line to access an ATM. Apparatus and methods are provided for a smart card that stages transactions by capturing the amount, pin and other necessary information on the smart card itself, before the user begins interacting with the ATM. Information captured by the smart card may be transferred to ATM when the smart card is inserted into ATM. The user does not provide the ATM with any additional information after inserted the smart card into the ATM, thereby improving the transaction processing efficiency of the ATM and enhancing user satisfaction.

16 Claims, 8 Drawing Sheets

DUAL COMMUNICATION CHANNEL SMART CARD

FIELD OF TECHNOLOGY

Aspects of the disclosure relate to improving transaction efficiency and operation of automated teller machines ("ATMs").

BACKGROUND OF THE DISCLOSURE

Wait times at ATMs may detract from the utility of these self-service machines. ATMs are deployed to provide self-service kiosks that allow users to quickly perform common financial transactions. An ATM may be capable of processing a higher number of financial transactions per unit of time than a human teller. However, it has been increasing common for users to have to wait to access an ATM while other users complete their transactions at the ATM.

For example, an ATM may first require a user to insert a card, such as a debit card, into the ATM. The card may include account or other information that links the user to one or more financial accounts. Information stored on the card may include a unique identifier and username.

Then, the ATM typically requires numerous inputs from a user before a transaction may be initiated and completed. Based on the information stored on the card, the ATM may prompt the user to enter a personal identification number ("PIN") associated with the card. The PIN may be used to authenticate the user at the ATM. After authenticating the user, the ATM may then prompt for inputs such as amount of money, an account selection or other transaction details.

The prompting for information by the ATM, and the subsequent entry of a response by the user, all increase an amount of time each user may spend at the ATM. Others may need to wait while the user responds to the ATM prompts and completes their desired transaction. The lengthy wait time may increase user dissatisfaction and reduce a transaction efficiency of the ATM.

Some technology solutions exist for reducing the number of ATM prompts and user responses. However, these solutions typically require additional third-party hardware and services, such as a mobile device or laptop/desktop computer system. These solutions, in addition to increasing costs associated with obtaining the third-party hardware and services, increases security risks. For example, a third-party device must be adequately secured to transmit and receive sensitive financial data. Communication between the third-party device and the ATM must also be secured. Furthermore, any sensitive financial data stored locally on a third-party device must be adequately secured to prevent unauthorized access to that data.

It would be desirable to reduce user wait-times at an ATM and improve the transaction efficiency of an ATM without relying on third-party hardware or services. It would be further desirable to improve transaction efficiency of an ATM without imposing costs to procure and maintain third-party hardware or services. It would also be desirable to improve the transaction efficiency of an ATM without increasing security risks associated with third-party hardware and services.

Accordingly, it is desirable to provide apparatus and methods for a DUAL COMMUNICATION CHANNEL SMART CARD.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
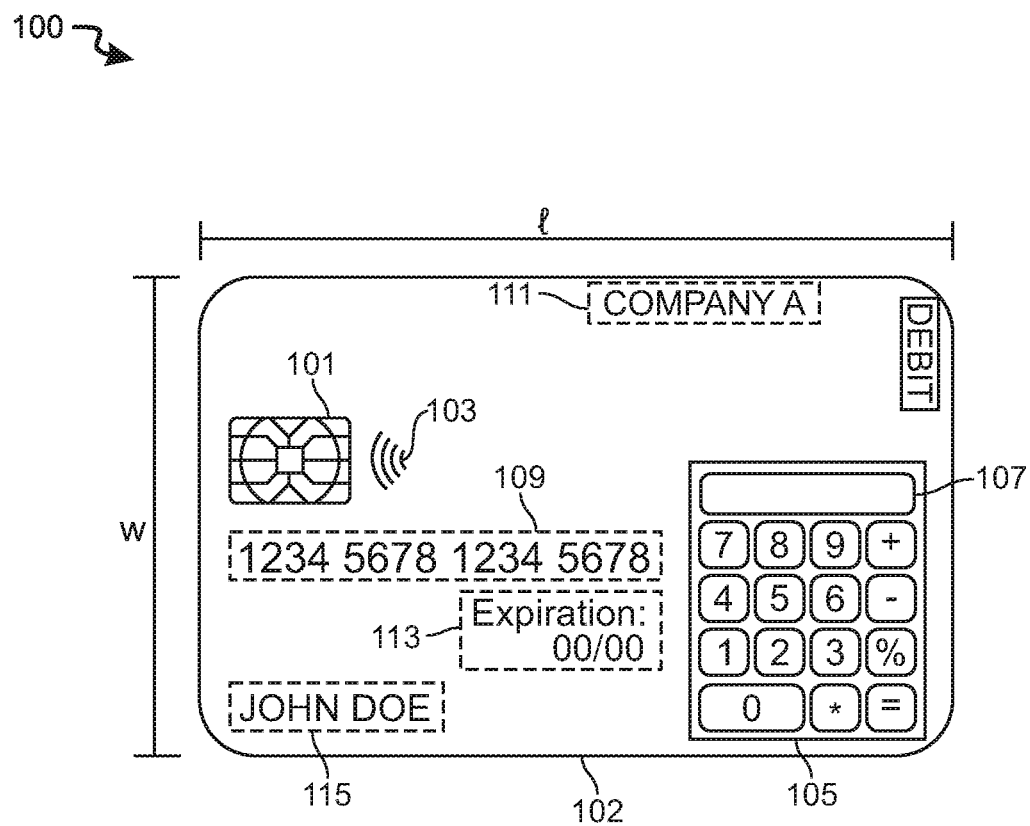
FIG. 1 shows illustrative apparatus in accordance with principles of the disclosure.
Figure 1:
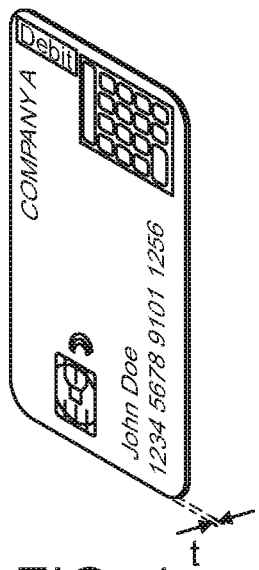

Apparatus for a smart card are provided. Apparatus may increase transaction processing efficiency of an Automated Teller Machine ("ATM").

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM, perform power management routines or other suitable tasks.

The smart card may include a pressure sensitive button. The pressure sensitive button may have a thickness that is not greater than 0.8 mm. The pressure sensitive button may be actuated by a user to activate the smart card. Actuation of the pressure sensitive button may provide an electronic signal to the microprocessor or any other component of the smart card. For example, actuating the pressure sensitive button may activate the microprocessor, keypad or communication interface of the smart card.

In some embodiments, the smart card may be activated in response to receiving high frequency wireless signals. The high frequency signals may be detected by the communication interface. The high frequency signals may be broadcast by an ATM. The high frequency signals may be generated by a near field communication ("NFC") reader. The high frequency signals may provide power to one or more components of the smart card. In some embodiments, in response to receiving the power, the microprocessor may be activated and begin to draw power from a battery on the smart card.

The smart card may operate in a networked environment. The smart card may support establishing communication channels with one or more ATMs. The smart card may connect to a local area network ("LAN"), a wide area network ("WAN") or any suitable network. When used in a LAN networking environment, the smart card may be connected to the LAN through a network interface or adapter. The communication interface may include the network interface or adapter.

When used in a WAN networking environment, the smart card may include a modem or other means for establishing communications over a WAN, such as the Internet. The communication interface may include the modem. It will be appreciated that the network connections shown are illustrative and other means of establishing a communications link between devices may be used. The existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, multiprocessor systems, microcomputers, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to a keypad of the smart card, a communication interface and the microprocessor. The battery may have a thickness that is not greater than 0.5 mm.

The battery may be recharged via an electrical contact when the smart card is in contact with the ATM. The smart card's power source may include high frequency signals received from an ATM or other network node. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to the rechargeable battery when the smart card is inserted into an ATM card reader.

The smart card may include a communication interface. The communication interface may have a thickness that is not greater than 0.8 mm. The communication interface may include a circuitry for establishing electronic communication with an ATM or other self-service kiosk. The communication interface may be configured to implement protocols for wireless communication. The communication interface may include a wireless circuit.

The wireless circuit may include software and/or hardware for establishing a wireless communication channel with the ATM. Such protocols may include Wi-Fi, Bluetooth, Ethernet, NFC and cellular telecommunications. Wi-Fi may include passive Wi-Fi with lower power consumption than typical Wi-Fi. The communication interface may include a Near Field Communication ("NFC") chip. The NFC chip may communicate over a typical NFC range (~2 in.) when transmitting or receiving sensitive data. An illustrative NFC chip may utilize a 13.56 MHz radio frequency.

A microprocessor of the smart card may be configured to dynamically limit or expand transmitting and receiving ranges. The microprocessor may dynamically limit or expand transmitting and receiving ranges in response to detected location of the smart card.

For example, the microprocessor may expand a communication range when the smart card is within a "familiar" zone. Expanding a communication range may include using a Wi-Fi communication channel rather than an NFC communication channel. Expanding a communication range may include using a typical Wi-Fi range such as 150-300 ft. when searching for available ATM wireless communication channel and using passive Wi-Fi after establishing the communication channel with the ATM.

A familiar zone may be a pre-defined radius from a user's home or work location. The microprocessor may limit a communication range when the smart card is within an "unknown" zone. For example, the microprocessor may limit a communication range when the user is travelling. The microprocessor may restrict the smart card to using NFC or contact-based communication channels when operating in an unknown zone.

In some embodiments, the smart card may be activated in response to receiving wireless signals from the ATM. The wireless signals may provide power to one or more components of the smart card. Illustrative wireless signals may include NFC signals. For example, in response to receiving power via the wireless signals, a microprocessor of the smart card may be activated.

The smart card may include a battery for powering the communication interface and the microprocessor. The smart card may include an electrical contact that may be used to establish a wired or contact-based connection to the ATM. For example, the smart card may include an "EMV" chip.

EMV is a technology that derives its name from the companies (Europay, MasterCard, and Visa) that helped develop the technology. When an EMV chip is inserted into a specialized card reader, the reader powers the EMV chip and the EMV chip generates a new authorization code each time it is used to authorize a transaction. Thus, simply copying information printed on the face of the smart card or encoded on a magnetic stripe may be insufficient to initiate a fraudulent transaction.

The EMV chip may function as an electrical contact. The EMV chip may include software and/or hardware for establishing a wired communication channel with the ATM. The battery of the smart card may be recharged via the at least one electrical contact when the smart card is in contact with the ATM via the EMV chip.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in, and protected by, the housing.

For example, an ATM may include a card reader constructed to receive a card that conforms to a predefined form factor. As illustrative form factor is defined in specifications published by the International Organization for Standardization ("ISO"). Illustrative specifications may include: ISO/IEC 7810, ISO/IEC 7811 and ISO/IEC 7816, which are hereby incorporated herein by reference in their respective entireties.

The smart card may include non-transitory memory locations within the housing. The microprocessor may access such memory locations. The non-transitory memory may be included in the microprocessor. Non-transitory memory locations may store instructions, that when executed by the microprocessor, cause the smart card to perform various functions. For example, the microprocessor may instruct the communication interface to scan for a wired or wireless communication channels and connect to a detected ATM.

The smart card may include a keypad. The keypad may be mounted on an outside of the housing. The keypad may include mechanical keys. The keypad may be mounted on an outside of the housing. The housing of the smart card may conform to the predefined form factor. The keypad may not increase the form factor defined by the ATM for receiving the smart card. For example, the housing and the keypad mounted on an outside of the housing may collectively have a thickness that is not greater than 0.8 mm. An entire surface area of the smart card, including the keypad, may not exceed 86 mm×54 mm.

The ATM may utilize information stored on the smart card to authenticate a user at the ATM. In addition to information stored on the smart card, the ATM may prompt the user for authentication information before allowing the user to initiate a transaction at the ATM. The authentication information may include a PIN or biometric feature.

After authenticating the user, the ATM may allow the user to initiate a transaction at the ATM. Illustrative transactions may include withdrawing cash, transferring funds between accounts or depositing cash/checks.

The keypad may include mechanical keys. A user of the smart card may enter data using the keypad. The data entered by the user may be captured by the microprocessor. Data entered by the user via the keypad may include inputs that would typically be requested by the ATM. For example, the user may enter authentication information using the keypad.

Data entered by the via the keypad may include transaction information that would typically be requested by the ATM to initiate a transaction on behalf of the user. For a cash withdrawal transaction information may include a PIN, amount, account, denomination (of bills or currency) and time restrictions. The microprocessor may formulate transaction instructions corresponding to a cash withdrawal transaction based on the transaction information entered using the keypad.

The keypad may allow the user to enter data that will be needed by the ATM before the user accesses the ATM. Entering the data before accessing the ATM may reduce an amount of time the user spends entering data after accessing the ATM. Reducing the amount of time the user spends entering data at the ATM may, in turn, reduce the amount of time other users spend waiting to access to the ATM. Reducing the amount of time each user spends entering data at the ATM may increase the number of transaction that the ATM may process per unit of time. Thus, reducing the amount of time anyone user spends entering data at the ATM may increase the transaction processing efficiency of the ATM.

As discussed above, data entered using the keypad may include authentication information that would typically be requested by an ATM before providing a user access to one or more services of the ATM. For example, the user may enter a PIN or biometric feature, a telephone number, address or zip code. Such information may be used to authenticate the user. The authentication information may be encrypted and stored on the smart card. After capturing the authentication information, the smart card may transfer the authentication information to the ATM without requiring any further input from the user.

As discussed above, data entered using the keypad may include transaction information that would typically be requested by an ATM before implementing one or more services of the ATM. For example, the user may enter a cash withdrawal amount using the keypad before reaching the ATM. The smart card may transmit the keyed-in withdrawal amount to the ATM without requiring any further input from the user. The smart card may instruct the ATM to execute the withdrawal transaction for the previously entered withdrawal amount without requiring any further input from the user.

Other illustrative data that may be entered via the keypad may include a user's name, an expiration date of the smart card, an amount, a currency, a card verification value ("CVV") or any other suitable data.

In some embodiments, data entered using the keypad may be transferred to ATM when the smart card is inserted into or otherwise in communication with the ATM. In some embodiments, data entered using the keypad may be transferred to the ATM before the user inserts the smart card into the ATM. The information transferred to the ATM may be utilized by the ATM to complete transaction details that would have otherwise required prompting the user for inputs at the ATM. Capturing the data on the smart card before the user accesses the ATM reduces the amount of time a user needs to spend entering data at the ATM, thereby increasing the transaction processing efficiency of the ATM.

The smart card may include executable instructions. The executable instructions may be stored in a non-transitory memory. The executable instructions, when run by the microprocessor, may implement various functions of the smart card. The instructions may capture data entered using the keypad. The executable instructions may encrypt the captured data.

The smart card may include a dedicated encryption controller for performing the encryption. The executable instructions may store the encrypted data locally on the smart card.

The executable instructions may formulate a set of transaction instructions executable by the ATM. The transaction instructions may be formulated based on the information (e.g., transaction information) captured by the keypad. For example, the microprocessor may formulate transaction instructions for executing a transaction at the ATM. The microprocessor of the smart card may integrate the information captured from the keypad into the set of transaction instructions that are executable by the ATM.

The smart card may transfer the transaction instructions to the ATM. The smart card may transfer the transaction instructions in response to establishing a communication channel with the ATM. The communication interface may be used to establish the communication channel. For example, the smart card may establish the communication channel when the smart card is inserted into a card reader of the ATM. The ATM may autonomously initiate a transaction based on the information or transaction instructions stored on the smart card, thereby improving the transaction processing efficiency of the ATM.

For example, using the keypad, the smart card may capture a PIN and withdrawal amount from a user. The smart card may formulate a withdrawal request for the amount entered by the user. The smart card may formulate the withdrawal request before the user inserts the smart card into the ATM.

The smart card may include a communication interface that includes a wireless communication interface. The smart card may scan for a wireless communication channel broadcast by the ATM. The smart card may attempt to establish a connection to the ATM using the detected wireless communication channel. The smart card may establish the wireless communication channel to the ATM before the smart card is inserted into the ATM.

The wireless communication channel may only be used for transferring a set of transaction instructions previously formulated by the user and stored locally on the smart card. In response to receiving the transaction instructions, the ATM may initiate pre-processing of the transaction instructions.

Pre-processing may include verifying any authentication information included in the transaction instructions. Pre-processing may include verifying that the user has sufficient funds available to warrant dispensing cash to the user. The pre-processing may determine that further input is needed from the user before dispensing cash.

For example, a user's account or ATM location may be associated with a specific fraud-mitigating protocol. The fraud-mitigating protocol may require a user to provide additional authentication information or verify previously provided authentication information before the ATM executes transaction instructions received from the smart card.

The ATM may complete pre-processing of a transaction before the user approaches the ATM and inserts the smart card into the ATM. The ATM, in response to detecting that the smart card has been inserted into the ATM, may determine that it has pre-processed transaction instructions associated with the inserted smart card. The ATM may then execute the transaction implemented by the previously received transaction instructions.

From a perspective of the user, a transaction may be executed in real time after the smart card is inserted into the ATM. For example, if the transaction instructions correspond to a withdrawal request, in response to inserting the smart card into the ATM, the ATM may dispense the amount of cash requested in the transaction instructions to the user.

In some embodiments, the transaction instructions formulated by the microprocessor and stored locally on the smart card may not be transferred to the ATM before the smart card is inserted into the ATM. Such embodiments may provide an additional layer of fraud-mitigation by reducing the possibility that the transaction instructions may be intercepted during wireless transmission to the ATM.

The transaction instructions may be transferred to the ATM using a contact-based communication channel, such as an EMV chip. When the transaction instructions are received by the ATM, the ATM may verify authentication information included in the transaction instructions and execute the requested transaction.

In some embodiments, the smart card may capture authentication information. The smart card may encrypt the captured authentication information and transfer the authentication information to the ATM. The ATM may therefore not prompt the user for authentication information after the smart card is inserted into the ATM.

After the user inserts the smart card into the ATM, the smart card may interact directly with the ATM, without requiring any further authentication information from the user. The smart card may transfer the authentication information to the ATM in response to an authentication request submitted by the ATM directly to the smart card.

After the ATM authenticates the user and the inserted smart card, the smart card may then transfer transaction instructions to the ATM. The transaction instructions may be formatted in a fashion that is understandable for processing by the ATM. The ATM may autonomously decrypt received transaction instructions.

The ATM may autonomously execute the set of transaction instructions and initiate a withdrawal transaction based on the withdrawal amount and account information previously entered by the user. The set of transaction instructions formulated by the microprocessor may be sufficient to execute the withdrawal transaction without the ATM prompting the user for additional input data. The ATM may provide the requested amount of cash to the user without requiring the user to enter any information at the ATM after the user inserts the smart card into the ATM.

The smart card may encrypt data entered by the user. The smart card may encrypt all or any data entered by the user via the keypad. The ATM may decrypt data it receives from the smart card. The smart card may encrypt less than all the data associated with a set of transaction instructions. For example, the smart card may only encrypt a PIN or other authentication information.

Limiting the amount of data encrypted by the smart card may allow the smart card to use less power to function. Using less power may improve the functionality of the smart card by extending its battery life and extending the amount of time between charging.

Limiting the amount of data encrypted by the smart card may improve functionality of the ATM. The ATM may only need to decrypt selected data and not an entire set of transaction instructions. This may speed up a response time of the ATM when processing transactions instructions received from the smart card. Limiting the amount of data that needs to be decrypted by the ATM may further increase the transaction processing efficiency of the ATM per unit of time.

The microprocessor may be configured to delete encrypted data from the smart card after expiration of a pre-determined time period. The microprocessor may be configured to delete the set of transaction instructions from the smart card after expiration of a pre-determined time period.

The keypad of the smart card may have an inactive state. In the inactive state, the keypad may not capture data entered using the keypad. For example, in the inactive state, the microprocessor may not supply power to the keypad. In the inactive state, the microprocessor and associated executable instructions may not capture data entered by the user using the keypad.

The keypad may have an active state. In the active state, the keypad may be capable of capturing data entered by a user. In the active state, the microprocessor may supply power to the keypad. In the active state, the microprocessor and associated executable instructions may capture and/or encrypt data entered by the user using the keypad.

The inactive state of the keypad may be a default state. When the keypad is in the inactive state, data entered using the keypad of the smart card is not captured by the microprocessor. The microprocessor may toggle the keypad between the inactive and active states. For example, the microprocessor may activate the keypad in response to establishing a communication channel with an ATM.

A system for increasing transaction processing efficiency of an Automated Teller Machine ("ATM") is provided. The system may include a smart card having a thickness not greater than 0.8 mm. The smart card may have a width not greater than 54 mm. The smart card may have a length not greater 86 mm.

The system may include a communication interface. The communication interface may be embedded in the smart card. The communication interface may include hardware and software for communicating with an ATM. For example, the smart card may include circuitry for communicating using Wi-Fi, NFC, Bluetooth, cellular or any suitable wireless network or protocol. The communication interface may include a wired communication interface. For example, the smart card may include circuitry and externally accessible electrical contact(s) for communicating over a wired Ethernet or any suitable wired network or protocol.

The system may include a microprocessor. The microprocessor may be embedded in the smart card. The microprocessor may control communication conducting using the communication interface. For example, the microprocessor may initiate communication with an ATM using the communication interface. The microprocessor may terminate communication with the ATM by turning off the communication interface. Turning off the communication interface may include disconnecting the smart card from the ATM. Turning off the communication interface may include terminating an ongoing communication session between the smart card and the ATM. Turning off the communication interface may include cutting off power supplied to the communication interface.

The system may include a user input system. The user input system may be in electronic communication with the microprocessor. The user input system may include a keypad. The user input system may include an input controller. The input controller may capture data entered using the keypad. The user input system may include a voice controller. The voice controller may capture voice commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart card. In some embodiments, executable instructions may be stored in a non-transitory memory on the ATM. The executable instructions may be transferred to the smart card using a communication channel established by the communication interface of the smart card.

The executable instructions, when run by the microprocessor, may self-authenticate a user of the smart card. Self-authentication may be conducted over a communication channel established using the communication interface. The communication channel may be a secure communication linking the smart card and the ATM.

The executable instructions, when run by the microprocessor on the smart card may formulate transaction instructions executable by the ATM. The transaction instructions may be formulated based on the encrypted data. The transaction instructions may be transferred to the ATM over a secure communication channel linking the smart card and the ATM.

Transaction instructions may be formulated before a secure communication channel is established between the smart card and the ATM. For example, a user of the smart card may enter data using the keypad when the user is at home. While at home, the smart card may not be within a communication range of an ATM.

An ATM may only establish a secure communication link with the smart card when the smart card is within a threshold distance of the ATM. When the smart card is within the threshold distance, the smart card may be likely or expected to access the ATM. In some embodiments, the secure communication link may only be established when the smart card initiates a request to establish the secure communication link. The user may initiate the request by actuating the pressure sensitive button or any suitable key of the keypad.

Transaction information or instructions stored locally on the smart card may be used to stage a transaction at the ATM. A staged transaction may include all data needed to execute a transaction at the ATM without requiring additional input from a user. For example, for a withdrawal transaction, the transaction instructions may include a PIN, the amount to be withdrawn and the account funds are to be withdrawn from. When the ATM receives the transaction information/instructions, the ATM may verify that the PIN is associated with the account. The ATM may also verify that the account includes sufficient funds to fulfill the withdrawal request.

After conducting the verification(s), the ATM may execute the withdrawal transaction based on the transaction information/instructions received from the smart card. Thus, the user of the smart card may not need to input any additional information after the transaction information/instructions are transferred to the ATM.

In some embodiments, after conducting the verification of the PIN and sufficient funds, the ATM may await an instruction from the user before executing the transaction. For example, the ATM may receive the transaction instructions over a wireless communication channel. The ATM may receive the transaction instructions over the wireless communication when the smart card is outside a threshold distance from the ATM.

The user of the smart card may enter transaction information used to formulate transaction instructions when the user is at home or at work. The transaction instructions may be transmitted to the ATM over a Wi-Fi or cellular communication channel. Later, the user may access the ATM. In response to the detecting the smart card, the ATM may ask the user to confirm execution of the previously received transaction instructions.

Transaction information/instructions may be transmitted from the smart card to a target ATM. The transaction information/instructions may be transmitted to a cloud computer system. When the smart card establishes a wired connection to the ATM, the ATM may check whether a staged transaction associated with the smart card is stored in the cloud computing system.

In some embodiments, after storing transaction information/instructions locally on the smart card, a flag may be set on the smart card. The ATM may be configured to check the flag and determine whether transaction information/instructions for a staged transaction have been generated and are stored on the smart card. The ATM may request and obtain the stored transaction information/instructions.

In some embodiments, the ATM may require authentication before establishing a wired connection with the smart card. For example, the ATM may require entry of the PIN or submission of a biometric feature before executing a staged transaction.

Executing a staged transaction may reduce the number of user inputs required at the ATM. Reducing the number of user inputs at the ATM improves the transaction processing efficiency of the ATM.

The microprocessor may configure the smart card to purge stored transaction information/instructions when an ATM does not establish a wired or contact-based communication channel with the smart card within a pre-determined time period.

A cloud computing system may receive transaction information/instructions from the smart card at a first time. When an ATM does not establish a wired connection with the smart card by a second time (and execute the transaction corresponding to the transaction instructions stored in the cloud system), the cloud computing system may purge the transaction information/instructions. In some embodiments, the interval between the first and second times may be set by the cloud computing system. The cloud computing system may assign a default interval to transaction information/instructions received from the smart card.

The cloud computing interval may assign a longer or shorter time interval based on a distance between a location of the smart card transmitting the transaction information/instructions and a location of an ATM. The system may use a machine leaning algorithm to determine an interval that provides sufficient time for the smart card user to travel to the ATM.

The machine learning algorithm may take account of traffic patterns, time of day and typical user behavior. For example, if transaction information/instructions are received closer to the end of a workday, the interval may be shorter than if the transactions instructions are received earlier in the workday.

The system may include a front controller. The front controller may be included in the ATM. Using an ATM communication channel, the front controller may receive encrypted input data from the smart card via the communication interface. The encrypted data may include transaction information/instructions. The transaction information/instructions may be received by the front controller from a cloud computing system.

The system may include a decryption controller. The decryption controller may be included in the ATM. The decryption controller may decrypt encrypted data received by the ATM from the smart card.

The system may include an input validation controller. The input validation controller may communicate with a remote computer server. The remote computer serer may be a cloud computing system. The remote computer server may validate the transaction data received from the smart card.

Validating the transaction data may include verifying whether transaction information/instructions received from the smart card are associated with a valid PIN or other valid authentication information. Validating the transaction data may include verifying whether transaction information/instructions are associated with sufficient funds for a specified account.

The system may include a payment dispatcher. The payment dispatcher may be included in the ATM. The payment dispatcher may dispense cash or other items in response to a positive validation received from the input validation controller.

The smart card may include a wireless communication interface. The executable instructions stored in a non-transitory memory may scan for a wireless ATM communication channel. An ATM wireless communication channel may only be detectable when the smart card is within a threshold distance of an ATM. For example, the ATM wireless communication channel may be purposefully configured to have a maximum transmission range that is limited to a threshold distance from the ATM.

In response to detecting the wireless ATM communication channel, the smart card may transfer the encrypted data to the ATM over the wireless ATM communication channel. The ATM may stage a transaction based on transaction information/instructions included in the received encrypted data. The ATM may execute the staged transaction only after establishing contact-based communication with the smart card.

The executable instructions stored on the smart card may purge encrypted data stored on the smart card when contact-based communication with the ATM is not established within a pre-determined time period. The ATM may purge transaction instructions received from the smart card when contact-based communication is not established with the smart card within a pre-determined time period.

In some embodiments, the smart card may include a wireless communication interface and a contact-based communication interface. When the smart card establishes a contact-based communication channel with an ATM, the smart card may operate in accordance with ATM defined protocols. Illustrative ATM protocols may include prompting a user of the smart card to enter PIN or other transaction information at the ATM using ATM hardware.

The smart card may also allow users to customer to stage transactions. The user may stage transactions by entering information directly into the smart using the keypad. The smart card may formulate transaction instructions executable by the ATM based on the transaction information entered using the keypad. The smart card may save the formulated transaction instructions locally on the smart card. Such locally saved transaction instructions may be referred to as a staged transaction.

When the smart card establishes a wireless communication channel with the ATM, using the wireless communication channel, the smart card may transfer the transaction instructions to the ATM. A wireless communication channel may be a Wi-Fi channel, an NFC channel or any other suitable wireless communication channel.

Upon receipt of the transaction instructions, the ATM may autonomously execute the received transaction instructions without establishing a contact-based connection to the ATM and without prompting the user for additional information or authentication. In some embodiments, no user input may be required after the smart card formulates the transaction instructions. Reducing user inputs at the ATM may improve the transaction processing efficiency of the ATM.

However, if the user were to insert the smart card into a card reader of the ATM, the ATM may attempt to establish a contact-based ATM communication channel. The smart card may then interact with the ATM using the contact-based communication interface and in accordance with protocols defined by the ATM. In some embodiments, the ATM may initially prompt the user to select whether to use a wireless communication protocol and autonomously execute transaction instructions saved locally on the smart card or to proceed using a contact-based communication interface and in accordance with protocols defined by the ATM.

The smart card may include software for coordinating use of the wireless and contact-based communication interfaces and associated communication channels. For example, a user may insert the smart card into a card reader of the ATM. A contact-based communication channel may be established by the ATM. Before prompting the user for inputs using the contact-based communication channel, the ATM may query the smart card whether any staged transactions have been entered by the user.

In such scenarios, if a staged transaction has been saved locally on the smart card, the smart card may transmit the staged transaction to the ATM using the contact-based communication channel. The ATM may prompt the user to select whether to execute the staged transaction, initiate a new transaction in accordance with ATM defined protocols or both.

In an alternative embodiment, the smart card may only include a wireless communication interface for transmitting staged transactions to an ATM. In such embodiments, the smart card may not be capable of conducting contact-based communication with the ATM or operating in accordance with ATM defined protocols. Such embodiments may provide specialized ATM access (e.g., by submitted staged transactions to the ATM). Such specialized access may be particularly useful for users that may have difficulty using conventional ATMs or initiating conventional transactions in accordance with ATM defined protocols.

For example, conventional ATM transactions may require users to respond to ATM prompts and enter responsive information using ATM hardware. Such actions may be challenging for users with visual or other disabilities. The smart card may be equipped with a specialized keypad that includes braille key descriptors. The smart card may include a voice controller that generates an audio message based on the data entered by the user.

The user may enter information using the specialized keypad from the comfort of their home. The smart card may generate an audio message confirming the information entered by the user. The user can securely listen to the audio message at home and confirm the entered information or make any desired changes. After receiving confirmation, the smart card may formulate transaction instructions based on the confirmed transaction information.

Before activating the wireless communication interface, the smart card may be configured to wait for actuation of a target key on the keypad. Actuation of the target key may indicate the user confirms the audio message and/or transaction instructions formulated based on the transaction information entered using the keypad. For security purposes, the microprocessor may randomly assign a key on the keypad as the target key. Randomly assigning the target key may prevent inadvertent or unauthorized confirmation of transaction instructions.

In some embodiments, the user may define a key sequence for confirming transaction instructions. The user defined key sequence may require actuating two or more keys concurrently. The user defined key sequence may require actuating a target key for a predefined time interval.

Confirmed transaction instructions may be transmitted to the ATM and, upon receipt by the ATM, autonomously trigger execution of the staged transaction. The ATM may execute the staged transaction without requiring the user to enter any additional information at the ATM.

In some embodiments, the ATM may detect a presence of the smart card when the smart card is inserted into a card reader of the ATM. However, the smart card may not be capable of interacting with the ATM via the card reader or any other contact-based communication channel. The ATM may only detect a presence of the smart card in response to the smart card being inserted into the card reader. All communication between the smart card and ATM may be conducted via a wireless communication channel.

The wireless communication interface may have an inactive state. In the inactive state, the wireless communication interface may be unable to transmit data. The wireless communication interface may have an active state. In the active state, the wireless communication interface may be capable of transmitting data. The microprocessor may toggle the communication interface from the inactive state to the active state in response to detecting actuation of a target key on keypad. Actuation of the target key may include actuation of a user defined key sequence. Actuation of the target key may include actuation of a system defined key sequence. The system defined sequence may be randomly assigned.

A system for improving transaction processing efficiency of an ATM is provided. The system comprising a smart card having a thickness not greater than 0.8 mm and a surface area not greater than 86 mm×54 mm. The smart card may include a short-range wireless communication interface. An exemplary short-range wireless communication interface may be configured to utilize NFC or radio-frequency identification ("RFID") communication protocols.

The smart card may include a long-range wireless communication interface. An exemplary long-range wireless communication interface may be configured to utilize Wi-Fi, cellular or satellite communication protocols.

The smart card may include a microprocessor. The smart card may include a user input system in electronic communication with the microprocessor. The user input system may include a keypad. The keypad may include mechanical keys. Each key may include a braille descriptor.

The user input system may include an input controller. The input controller may capture data entered using the keypad. The user input system may include a voice controller. The voice controller may generate an audio message based on the data entered by the user and captured by the input controller.

The smart card may include an encryption controller. The encryption controller may encrypt the data captured by the input controller. The smart card may include executable instructions stored in a non-transitory memory. The executable instructions when run by the microprocessor, may control operation of components of the smart card. For example, the microprocessor may establish an authentication communication channel with the ATM using the long-range communication interface. The microprocessor may self-authenticate the smart card to the ATM using the long-range communication interface.

Self-authentication may include providing the ATM with authentication credentials stored locally on the smart card. The self-authentication process may not submit any prompts the user or require any inputs from the user. Authentication credentials may include a PIN or a biometric feature. The authentication credentials may be provided by the user during a process of entering transaction information.

In some embodiments, the user may be required to enter authentication credentials each time transaction information is entered using the keypad. In some embodiments, the smart card may only require the user to enter authentication credentials after expiration of a pre-determined time period. The ATM may be configured to verify authentication credentials provided by the smart card before executing transaction instructions received from the smart card.

The microprocessor, may establish a secure wireless communication link with the ATM using the short-range communication interface. The microprocessor may autonomously trigger execution of a transaction at the ATM by transferring the transaction instructions to the ATM using the short-range communication interface.

The microprocessor may autonomously trigger execution of a transaction at the ATM by transferring transaction instructions to the ATM. Autonomously triggering a transaction at the ATM may improve the transaction processing efficiency of the ATM by avoiding delays associated with the ATM prompting for and, waiting to receive responses to, additional information.

The microprocessor may be configured to store a first transaction and a second transaction locally on the smart card. The microprocessor may trigger execution of the first transaction at a first ATM. The microprocessor may trigger execution of the second transaction at a second ATM. The microprocessor may trigger execution of the second transaction at the second ATM after the first transaction is executed by the first ATM.

The first transaction may be triggered at the first ATM by transferring a first set of transaction instructions to the first ATM using a long-range communication interface. The second transaction may be triggered at the second ATM by transferring a second set of transaction instructions to the second ATM using a short-range communication interface.

The microprocessor may trigger execution of the first and second transactions at the first ATM. The first transaction may be triggered by transferring a first set of transaction instructions to the first ATM. The second transaction may be triggered at the first ATM by transferring a second set of transactions to the first ATM.

The microprocessor may delete locally stored transaction data, such as transaction information or formulated instructions, when the ATM does not establish a secure wireless communication link with an ATM within a pre-determined time period. The microprocessor may delete locally stored transaction data when the smart card does not establish a secure wireless communication link with an ATM within a pre-determined time period using the short-range communication interface.

The ATM may include a front controller. The front controller may receive encrypted data over the secure wireless communication link using a communication protocol that is compatible with the smart card's short-range communication interface. The front controller may receive encrypted data over a secure wireless communication link using a communication protocol that is compatible with the smart card's long-range communication interface.

Methods for improving transaction processing efficiency of an ATM are provided. Methods may include capturing transaction information using a keypad embedded in a smart card. Methods may include encrypting the transaction information. Methods may include storing the encrypted transaction information locally on the smart card.

Methods may include formulated transaction instructions based on the transaction information. Methods may include providing audio confirmation to the user of the transaction information/instructions stored locally on the smart card.

Methods may include transferring encrypted transaction information from the smart card to an ATM using a first wireless communication channel. The first wireless communication channel may utilize long-range communication protocols. An illustrative first communication channel may include a Wi-Fi communication channel. Methods may include authenticating the smart card at the ATM using a second wireless communication channel. The second wireless communication channel may utilize short-range communication protocols. An illustrative second communication channel may include an NFC communication channel.

After successfully authenticating the smart card at the ATM, methods may include triggering execution of a transaction at the ATM using the encrypted transaction information. Methods may include triggering execution of the transaction without prompting or receiving any input from a user of the smart card after transferring transaction information from the smart card to the ATM.

Methods for improving transaction processing efficiency of an Automated Teller Machine ("ATM") are provided. Methods may include capturing transaction information entered by a user via a keypad embedded in a smart card. Methods may include formulating transaction instructions based on the entered transaction information.

Methods may include encrypting the transaction information. Methods may include storing the encrypted transaction information locally on the smart card. Methods may include encrypting the transaction instructions. Methods may include storing the encrypted transaction instructions locally on the smart card.

Methods may include transferring the encrypted transaction instructions from the smart card to an ATM. Methods may include formulating a staged transaction at the ATM based on the encrypted transaction information. The staged transaction may include transaction information needed for the ATM to execute a transaction autonomously, without requiring additional user input. Methods may include executing the staged transaction without receiving any input from a user of the smart card after transferring the encrypted transaction instructions from the smart card to the ATM.

In some embodiments, the smart card may encrypt transaction information entered by a user. Methods may include providing audio confirmation to the user of the smart card. The audio confirmation may provide an audible articulation of the encrypted transaction information/instructions stored locally on the smart card.

Methods may include transferring transaction information/instructions from the smart card to the ATM using a contact-based communication channel. Methods may include transferring the encrypted transaction information/instructions from the smart card to the ATM using a wireless communication channel. The smart card may transmit the encrypted transaction information to the ATM. The ATM may formulate the transaction instructions based on the transaction information.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes keypad 105. Keypad 105 may be used by a user of smart card 100 to enter transaction information. Exemplary transaction information may include an amount of cash a user wishes to withdraw from an ATM. Transaction information may include a time or a time window when the user would like to withdraw the cash from the ATM.

For example, using keypad 105, the user may enter "100." This transaction information may represent an amount of funds (e.g., $100) the user wishes to withdraw from an ATM. A currency of the funds may be automatically assigned based on a location of the ATM. In some embodiments (not shown), keypad 105 may include denomination keys for specifying the denomination of the funds. Illustrative denominations may include appropriate symbols for dollars ($), euros (€), yen (Y), pounds (£) or any suitable currency.

The user may also enter "1530." This transaction information may represent that the user wishes to withdraw the $100 after 2:30 pm. When the user specifies a time, the ATM may not allow withdrawal of the $100 before 2:30 pm. In some embodiments, the user may not specify any time. Not specifying any time may indicate that the user wishes to be able to withdraw the funds at any time.

In some embodiments, the user may enter a time window. For example, the user may enter "1530-1430." This transaction information may indicate that the user only authorizes staged withdrawal of the $100 during between 2:30 pm and 4:30 pm. The ATM may not allow withdrawal of $100 before 2:30 pm. The ATM may not allow execution of the staged withdrawal of $100 after 4:30 pm. For example, smart card 100 may purge the information associated with the staged transaction after 4:30 pm. Smart card 100 may not push the transaction information to an ATM before 2:30 pm or after 4:30 pm. Smart card 100 may also purge transaction information after it has been transferred to an ATM.

Smart card 100 includes a microprocessor and other components for capturing, encrypting and storing the transaction information entered by a user. Smart card 100 may also include executable instructions for packaging transaction information entered via keypad 105 into staged transaction instructions that may be executed by an ATM.

Data entered using keypad 105 may displayed on screen 107. Screen 107 may display messages to a user of smart card 100. For example, screen 107 may display a prompt for the user to enter authentication credentials before formulating transaction instructions. Screen 107 may display a prompt for the user to enter authentication credentials before transmitting transaction instructions to an ATM. Illustrative authentication credentials may include a PIN or biometric information. Screen 107 may also display confirmation that transaction instructions have been successfully executed. For example, when a target key is actuated, the current account balance may be displayed on screen 107.

In some embodiments, screen 107 may itself be a target key that may be actuated by a user. For example, screen 107 may include organic light emitting diode ("OLED") technology. An OLED display may have a thickness that is not greater than 0.25 mm. OLEDs may be flexible. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The microprocessor may configure the OLED display to present a label describing a transaction or other functionality assigned to screen 107 as a target key. The microprocessor may dynamically configure screen 107 to implement different functions as a target key and may also dynamically change the presented label describing a current functionality assigned to screen 107 as a target key.

FIG. 1 shows that smart card 100 includes chip 101. Chip 101 may provide an electrical contact that is accessible through housing 102. Chip 101 may provide an electrical contact for establishing a wired or contact-based communication channel with an ATM (e.g., when card 100 is inserted into a card reader of the ATM). Chip 101 may be an EMV chip.

Chip 101 may store a copy of transaction information printed on a face of smart card 100. For example, chip 101 may store card number 109, username 115, expiration date 113 and issuing bank 111. Chip 101 may also store encrypted security information. The encrypted security information may be utilized to provide a "second factor" method of authentication prior to executing a staged transaction.

For example, smart card 100 may package transaction information entered by user 115 via keypad 105 into staged transaction instructions. The staged transaction instructions may include a PIN associated with smart card 100. The staged transaction instructions may be executable by an ATM without requiring any further input from user 115. The staged transaction instructions may be transferred to the ATM using wireless circuitry 103. In some embodiments, the staged transaction instructions may be transferred via chip 101.

After an ATM receives staged transaction instructions, the ATM may first determine whether the PIN included in the staged transaction instructions is associated with smart card 100. For example, the ATM may communicate with a remote server and determine whether the received PIN is associated with username 115 and/or card number 109.

As a second factor method of authentication, the ATM may determine whether the PIN included in the staged transaction instructions (and transferred to the ATM) successfully unlocks encrypted security information stored on chip 101. In the PIN successfully unlocks the encrypted security information, the ATM may execute the staged transaction instructions.

FIG. 1 also shows that smart card 100 has width w and length l. Smart card 100 may be any suitable size. For example, width w may be 53.98 millimeters ("mm"). Length l may be 85.60 mm. Smart card 100 has a thickness t. An illustrative thickness may be 0.8 mm. An exemplary form factor of smart card 100 may be 53.98 mm×85.60 mm×0.8 mm. This exemplary form factor may allow smart card 100 to fit into a user's wallet or pocket. This exemplary form factor may allow smart card 100 to fit into a card reader of an ATM.

Figure 2:
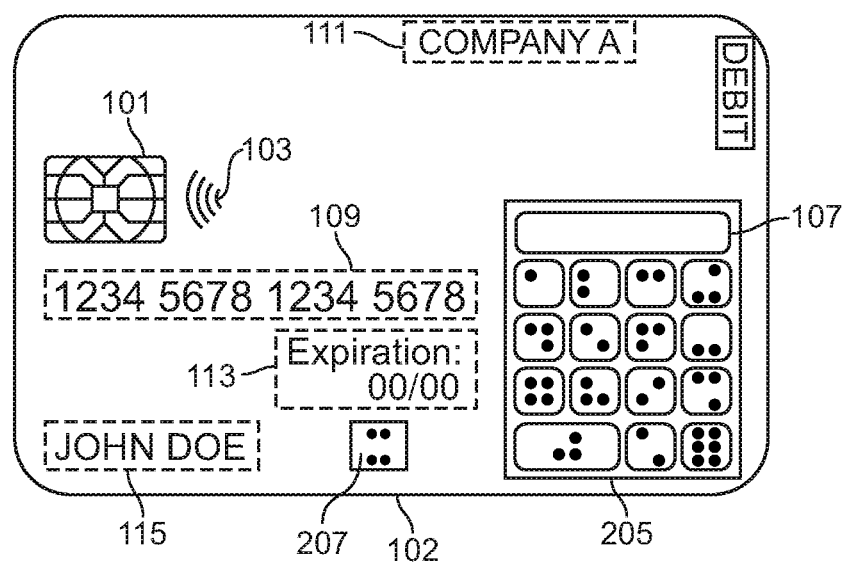
FIG. 2 shows an illustrative apparatus in accordance with principles of the disclosure.

FIG. 2 shows illustrative smart card 200. Smart card 200 may include one or more features of smart card 100 (shown in FIG. 1). For example, smart card 200 may have the same form factor (e.g., w, l and t) as smart card 100. Smart card 200 includes keypad 205. Keypad 205 may include one or more features of keypad 105 (shown in FIG. 1). Keys on keypad 205 include braille descriptors.

Keypad 205 includes target key 207. Target key 207 includes a braille descriptor. Actuation of target key 207 may confirm an audio message formulated by the microprocessor based on transaction instructions stored on smart card 200. Smart card 200 may wait for the confirmation before activating a wireless communication interface or transmitting the transaction instructions to an ATM.

FIG. 2 shows that smart card 200 includes a defined location for target key 207. In other embodiments, the microprocessor may randomly assign one of, or a combination of, the keys included on keypad 205 as a target key. In other embodiments, a user may assign a target key.

Actuation of target key 207 may instruct the microprocessor to toggle a communication interface of smart card 200 from an inactive state to an active state. Actuation of target key 207 may instruct the microprocessor to toggle a communication interface of smart card 200 from an active state to an inactive state. Actuation of target key 207 may initiate a specific or common transaction. For example, actuation of target key 207 may formulate transaction instructions corresponding to a cash withdrawal transaction from a default account based on the transaction information entered using keypad 205.

Figure 3:
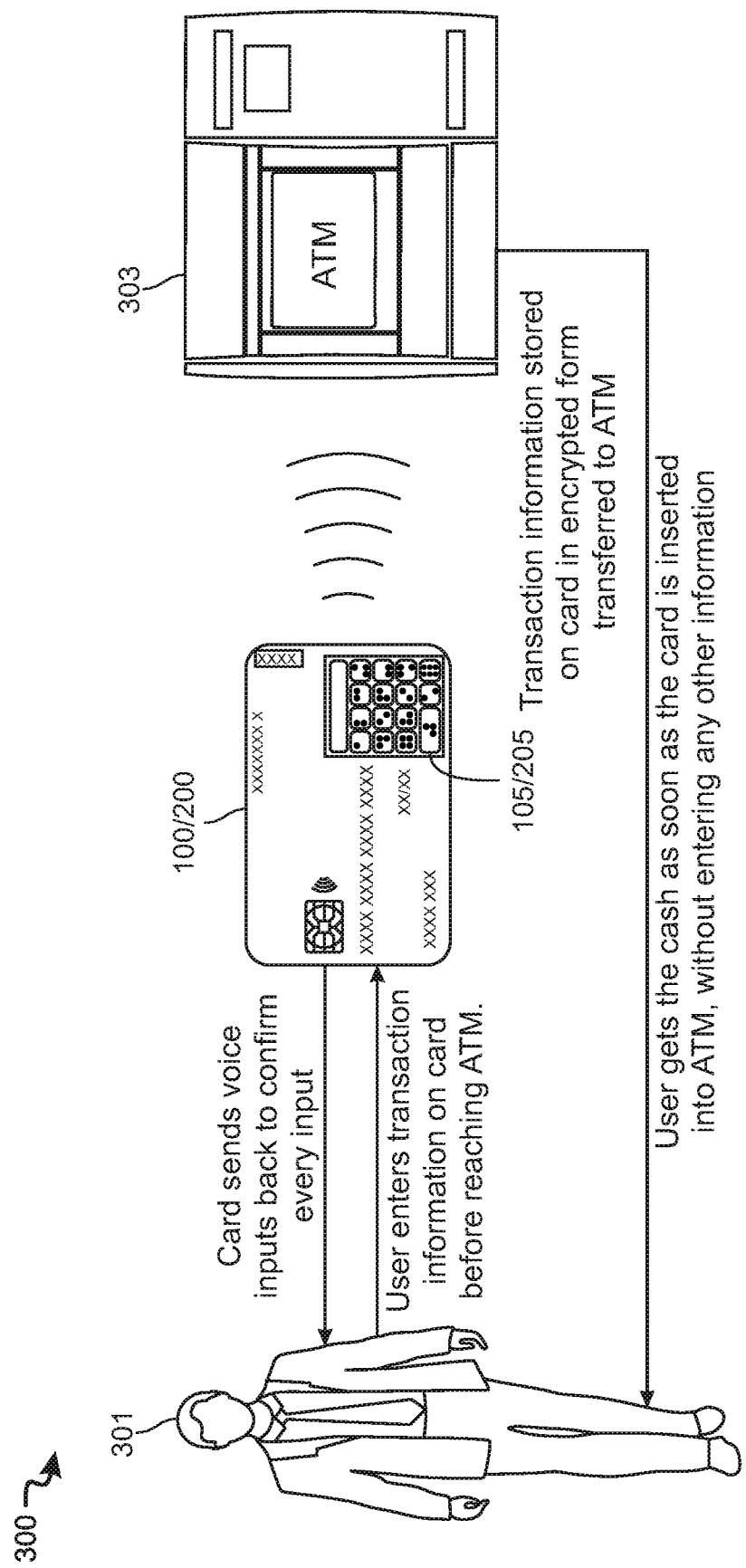
FIG. 3 shows illustrative apparatus and scenario in accordance with principles of the disclosure.

FIG. 3 shows illustrative scenario 300. In scenario 300, user 301 may enter a withdrawal amount and a PIN using keypad 105 of smart card 100 (shown in FIG. 1) or keypad 205 of smart card 200 (shown in FIG. 2) (collectively, "keypad 105/205" and smart card 100/200"). Transaction information entered by user 301 may be encrypted and stored locally on smart card 100/200. Smart card 100/200 may include a speaker (not shown). The speaker may provide user 301 with audio confirmation of transaction information entered using keypad 105/205. For example, the speaker may provide audio confirmation of the amount. In some embodiments, to maintain secrecy of a PIN, the speaker may not provide audio confirmation of the PIN.

After entering the amount, PIN, account and any other transaction information are encrypted and stored locally on smart card 100/200. Smart card 100/200 may include a specially designed memory location for securely storing transaction information.

In some embodiments, transaction information stored locally on smart card 100/200 may be transferred to ATM 303. In some embodiments, ATM 303 may formulate transaction instructions based on the transaction information received from smart card 100/200. In some embodiments, a microprocessor on smart card 100/200 may be configured to formulate transaction instructions executable by ATM 303 based on transaction information stored locally on smart card 100/200. No external hardware or software such as a mobile device, laptop or desktop device is needed to formulate the transaction instructions. The transaction instructions may also be encrypted and securely stored locally on smart card 100/200.

The microprocessor of smart card 100/200 may purge any locally stored transaction information or instructions that have not been transferred to ATM 303 within a predetermined time window. Transaction information or instructions may be transferred to ATM 303 when smart card 100/200 is inserted into a card reader (not shown) of ATM 303.

Transaction information or instructions may be transferred to ATM 303 when smart card 100/200 is within a target distance of ATM 303. Smart card 100/200 may include circuitry and software for conducting NFC communication. The target distance may correspond to being within range for conducting NFC communication. A typical NFC range is ~2 in.

In other embodiments, the microprocessor of smart card 100/200 may be configured to dynamically limit or expand wireless transmitting and receiving ranges. The microprocessor may dynamically limit or expand wireless transmitting and receiving ranges in response to detected location of smart card 100/200.

Smart card 100/200 may include a global positioning system ("GPS") chip for receiving and/or transmitting GPS signals. The microprocessor of smart card 100/200 may determine a current location of the smart card based on the received GPS signals. In other embodiments, the microprocessor of smart card 100/200 may determine a current location of the smart card based on signal triangulation or information received from an ATM.

After transaction information or instructions stored locally on smart card 100/200 are transferred to ATM 303, ATM 303 executes the transaction based on the received transaction information or instructions. FIG. 3 shows that for a withdrawal transaction, ATM 303 provides user 301 with the requested amount of cash when smart card 100/200 is inserted or otherwise establishes communication with ATM 303. User 301 will not have to input any information into ATM 303 or use the screen or keyboard of ATM 303. The process and apparatus shown in FIG. 3 will increase transaction efficiency of ATM 303 by allowing ATM 303 to process more transactions per unit of time.

Figure 4:
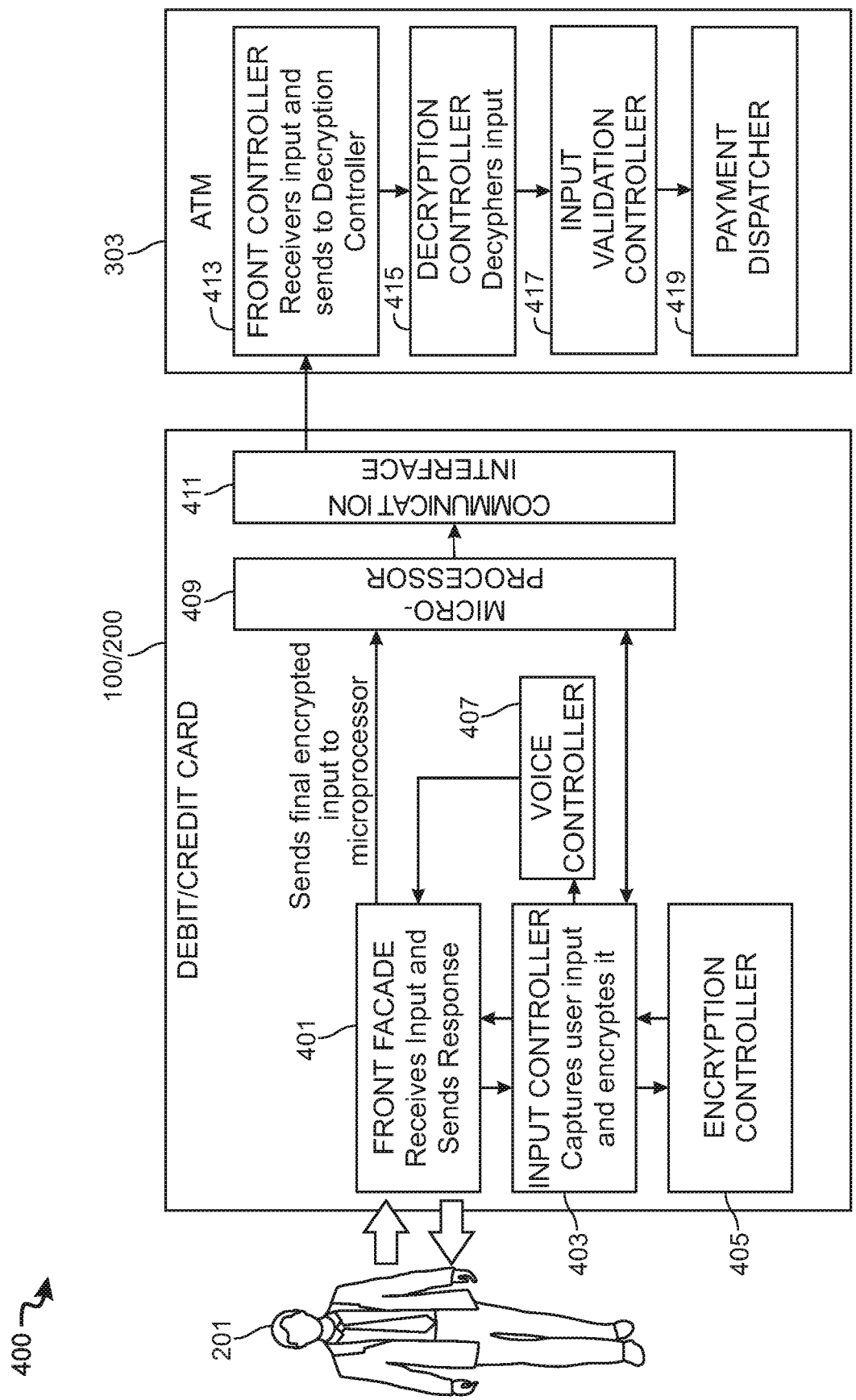
FIG. 4 shows an illustrative apparatus and scenario in accordance with principles of the disclosure.

FIG. 4 shows illustrative components 400 of smart card 100 (shown in FIG. 1), smart card 200 (shown in FIG. 2) and ATM 303.

FIG. 4 shows that smart card 100/200 includes front facade 401. Front facade 401 may include keypad 105/205 and a speaker (not shown) for receiving input and providing output to user 401. The speaker may be controller by voice controller 407. Voice controller 407 may receive instructions from input controller 403.

Input controller 403 may capture data input by user 301 using keypad 105/205. Input controller 403 may encrypt the captured data. Input controller 403 may store captured data locally on smart card 100/200. Voice controller 407 may generate electrical impulses that, when received by the speaker, audibly convey transaction information captured by input controller 403 to user 301. Voice controller 407 may generate electrical impulses that, when received by the speaker, audibly convey transaction instructions formulated by microprocessor 409.

Encryption of data captured by input controller 403 may be performed by encryption controller 405. Encryption controller 405 may encrypt the data using any suitable encryption algorithm. Illustrative encryption algorithms include RSA cryptography, Blowfish, AES, RC4, RC5, and RC6.

Smart card 100/200 may have limited power resources and may utilize an energy efficient encryption algorithm. An illustrative energy efficient encryption algorithm may include RC5, Skipjack and Secure IoT ("SIT").

SIT is a symmetric key algorithm that utilizes a 64-bit block cipher and requires a 64-bit key to encrypt data.

Typical symmetric key algorithms are designed to take an average of 10 to 20 encryption rounds to maintain a strong encryption process. Each encryption round utilizes mathematical functions to create confusion and diffusion. Generally, the more encryption rounds that are executed, the more secure the algorithm. However, the more encryption rounds that are executed also increase the amount of power consumed by the encryption algorithm.

To minimize power consumption, SIT is limited to just five encryption rounds and each encryption round includes mathematical operations that operate on 4 bits of data. To sufficiently secure the encrypted data, SIT utilizes a Feistel network of substitution diffusion functions such that encryption and decryption operations are very similar. The reduced number of encryption rounds is offset by the relatively long 64 bit key.

Microprocessor 409 may control overall operation of smart card 100/200 and its associated components. For example, microprocessor 409 may activate or deactivate keypad 105/205. When keypad 105/205 is active, input controller 403 may capture and encrypt data input using keypad 105/205. When keypad 105/205 is inactive, input controller 403 may not receive data from keypad 105/205. For example, in the inactive state, power may not be supplied to keypad 105/205.

In some embodiments, microcontroller 409 may activate or deactivate input controller 403. When active, input controller 403 may capture and encrypt data input using keypad 105/205. When inactive, input controller 403 may disregard data input using keypad 105/205.

Microcontroller 409 may activate or deactivate any component of smart card 100/200. Based on detecting a communication channel associated with ATM 303, microprocessor may activate one or more components of smart card 100/200. Microprocessor 409 may activate or deactivate components of smart card 100/200 based on a location of smart card 100/200.

For example, microprocessor 409 may only activate keypad 105/205 or input controller 403 when smart card 100/200 is in a familiar zone. User 301 may define a familiar zone by inputting a zip code into keypad 105/205. Microcontroller 409 may deactivate keypad 105/205 or input controller 403 when smart card 100/200 is in an unknown zone. Smart card 100/200 may include a GPS chip for detecting a current location.

Smart card 100/200 also includes communication interface 411. Communication interface 411 may include a network interface or adapter. Communication interface 411 may include hardware and/or software for establishing a communication channel with ATM 303. The ATM interface may be configured to implement protocols for wireless and/or wired communication with ATM 303.

FIG. 4 also shows illustrative components of ATM 303. ATM 303 includes front controller 413. Front controller 413 communicates with smart card 100/200 via communication interface 411.

Front controller 413 may include a network interface or adapter. Front controller 413 may include hardware and/or software for establishing a communication channel with smart card 100/200. Front controller 413 may be configured to implement protocols for wireless and/or wired communication with smart card 100/200.

Front controller 413 may receive transaction information and instructions transmitted stored on smart card 101 via communication interface 411. Front controller 413 may establish a wired or contact based connection with smart card 101. For example, Front controller 413 may establish a wireless connection with smart card 101. For example, front controller 413 may include an NFC reader.

For example, front controller 413 may include a card reader for establishing a wireless connection with smart card 101. For example, front controller 413 may include circuitry for interacting with EMV chip 101 (shown in FIG. 1) of smart card 100/200. Front controller 413 may include one or more read heads. The read head(s) may include a plurality of sub-heads that are positioned to extract information encoded on chip 101. The sub-heads may be positioned based on target chip locations as defined in ISO 7816, which is hereby incorporated herein by reference in its entirety.

ATM 303 includes decryption controller 415. Decryption controller 415 may decrypt transaction information/instructions received from smart card 101. The decrypted transaction information/instructions may be passed to input validation controller 417. Input validation controller 417 may connect to a remote computer server to validate authentication credentials or other transaction information received from smart card 100/200.

For example, input validation controller 417 may validate a PIN associated with user 301 and smart card 101. Input validation controller 417 may validate that an account associated with smart card 101 has an adequate balance to withdraw a requested amount included in the transaction information/instructions.

After input validation controller 417 validates the transaction information, input validation controller 417 may issue instructions to payment dispatcher 419. Payment dispatcher 419 may dispense the amount of cash requested by the transaction instructions (received from smart card 100/200) to user 301. ATM 303 does not require any input from user 301 after establishing communication with smart card 100/200 and receiving transaction instructions (which include transaction information) from smart card 100/200.

Figure 5A:
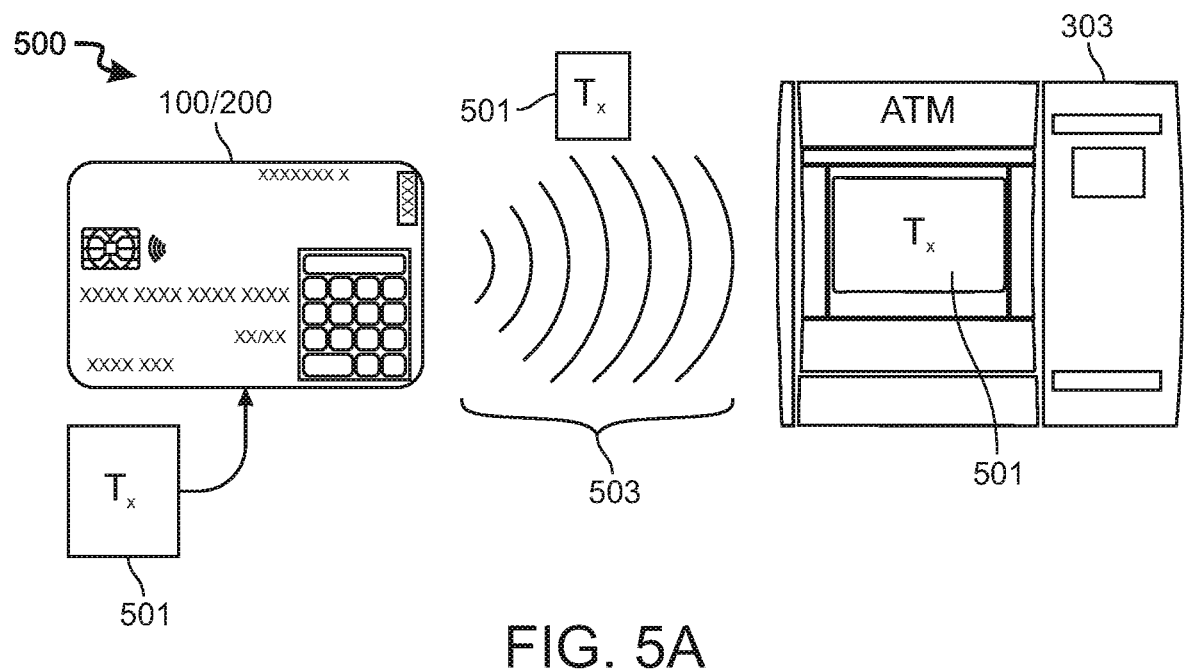
FIG. 5A shows an illustrative apparatus and scenario in accordance with principles of the disclosure.
Figure 5B:
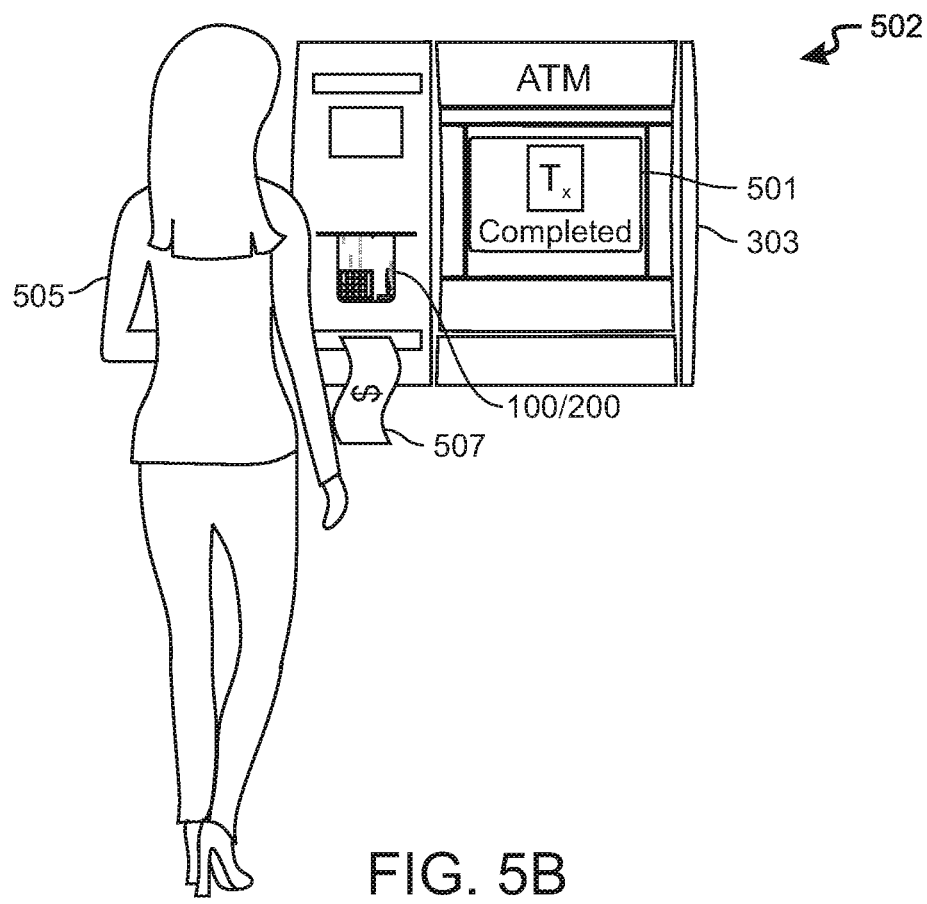
FIG. 5B shows an illustrative apparatus and scenario in accordance with principles of the disclosure.

FIGS. 5A-5B show illustrative scenarios 500 and 502. In scenario 500, user 505 has utilized keypad 105 of smart card 100 (or keypad 205 of smart card 200) to enter transaction information that is stored locally on smart card 100/200. Smart card 100/200 may formulate transaction instructions that are executable by ATM 303. Transaction information entered by user 505 is stored on smart card 100/200 as transaction instructions 501.

Scenario 500 shows that smart card 100/200 and ATM 303 communicate using communication channel 503. Communication channel 503 may be established when smart card 100/200 is within a threshold distance of ATM 303. For example, communication channel 503 may be an NFC channel established when smart card 100 and ATM 303 are within an NRC communication range of each other.

In other embodiments, communication channel 503 may be a Wi-Fi communication channel. For example, user 505 may enter the transaction information from a comfort of their home. User 505 may pass ATM 303 on the way to or home from work. Using a wireless network at home or work, user 505 may initiate a transfer of transaction instructions 501 to ATM 303.

Transaction instructions 501 are transferred over communication channel 503 to ATM 303. Scenario 500 shows that communication channel 503 is a wireless communication channel. In other embodiments, communication channel may be a wired or contact based communication channel.

FIG. 5B shows scenario 502. In scenario 502, user 505 has inserted smart card 100/200 into a card reader of ATM 303. As discussed above, user 505 may have transferred transaction instructions 501 specifically to ATM 303 because ATM 303 is at a convenient location.

Transaction instructions 501 may include timing restrictions. The timing restrictions may limit execution of transaction instructions 501 to a time window defined by the timing restrictions. If transaction instructions 501 are not executed within the time window, ATM 303 may delete transaction instructions 501. If transaction instructions 501 are not executed within the time window, smart card 100/200 may delete transaction instructions 501.

In scenario 502, user 505 inserts smart card 100/200 into ATM 303. ATM 303 recognizes, based on the information stored on smart card 100, that transaction instructions 501 are associated with smart card 100. ATM 303 may recognize that transaction instructions 501 are associated with smart card 100 based on transaction information encoded in an EMV chip or magnetic stripe of smart card 100. In some embodiments, when smart card 100/200 is inserted into ATM 303, smart card 100/200 may inform ATM 303 that transaction instructions 501 are ready to be executed by ATM 303.

Scenario 502 shows ATM 303 dispensing cash 507 to user 505. The amount of cash 507 is defined by transaction instructions 501. In scenario 502, ATM 303 dispenses cash 507 to user 505 without user 505 entering any data at ATM 303.

Figure 6A:
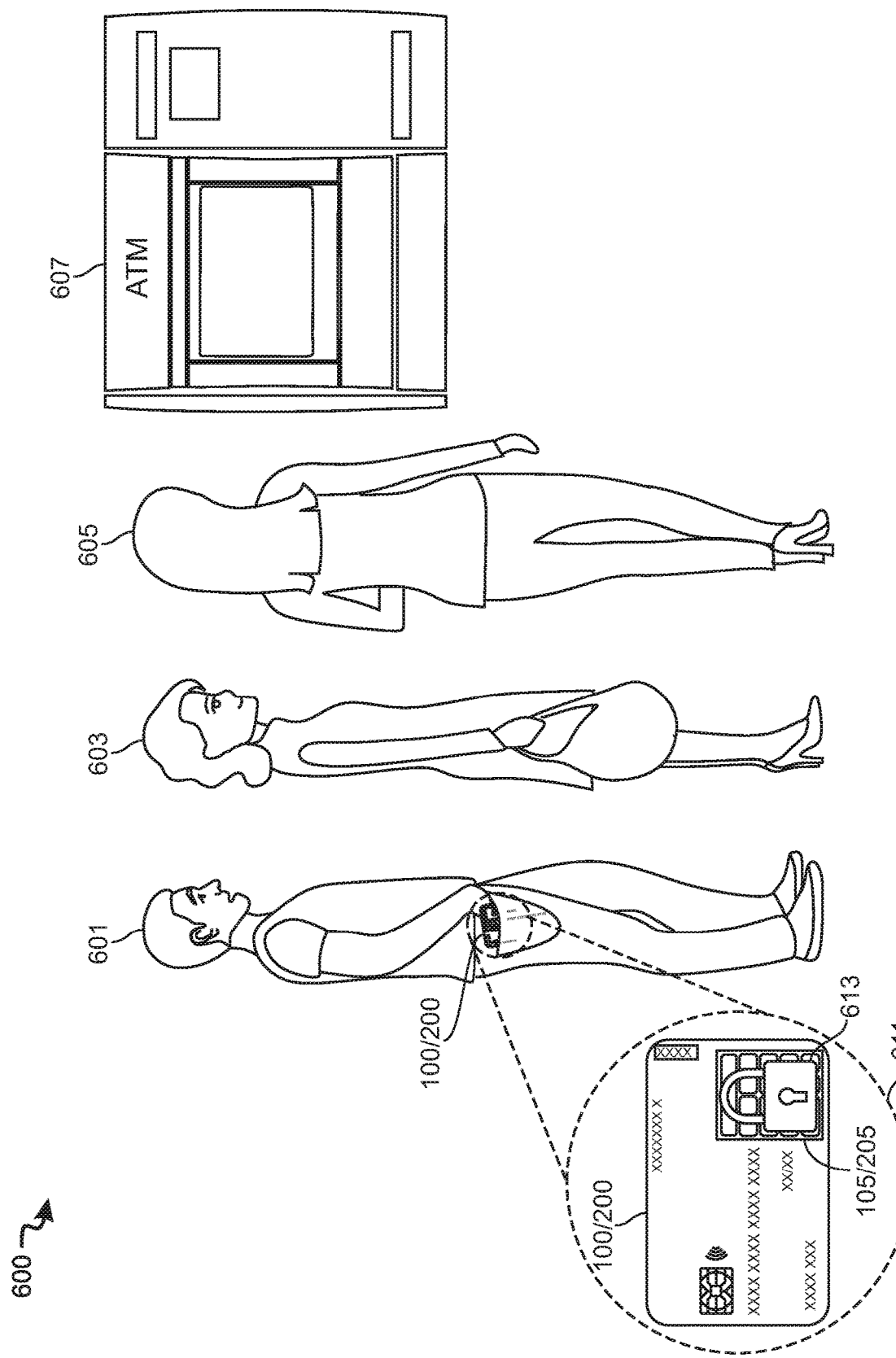
FIG. 6A shows an illustrative apparatus and scenario in accordance with principles of the disclosure.
Figure 6B:
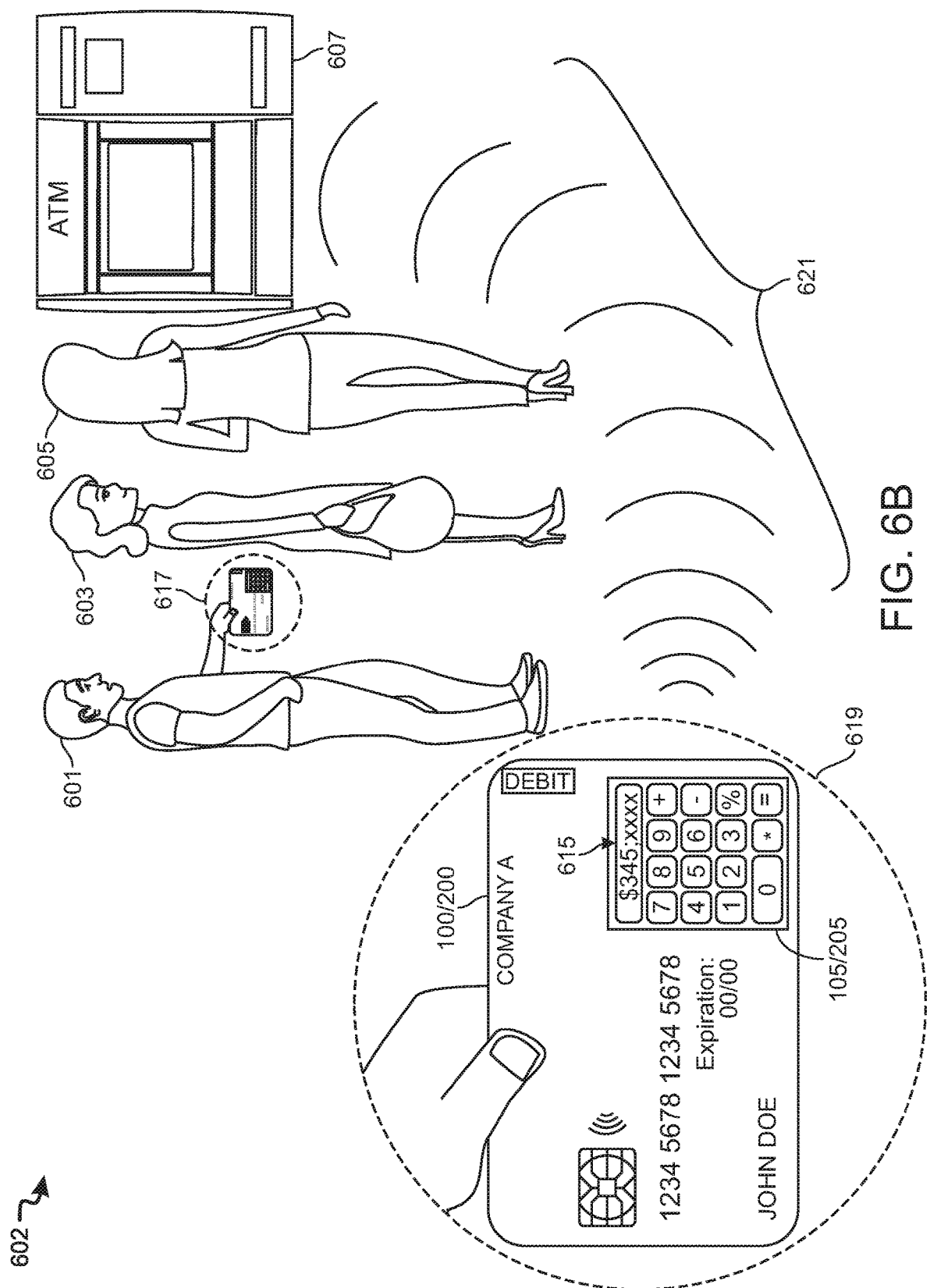
FIG. 6B shows an illustrative apparatus and scenario in accordance with principles of the disclosure.

FIGS. 6A and 6B show illustrative scenarios 600 and 602. FIG. 6A shows scenario 600. In scenario 600, users 601, 603 and 605 are all waiting on a line to use ATM 607. Scenario 600 shows that user 601 is last on the line. Scenario 600 also shows that user 601 is in possession of smart card 100 or smart card 200.

Enlarged view 611 of smart card 100/200 shows that keypad 105/205 of smart card 100/200 is in inactive state 613 and is locked. When keypad 105/205 is in inactive state 613, information may not be entered using keypad 105/205. When keypad 105/205 is in inactive state 613, information entered using keypad 105/205 may not be stored on smart card 100/200. In some embodiments, keypad 105/205 may remain locked until smart card 100/200 detects that it is within range of a communication channel of ATM 607.

FIG. 6B shows scenario 602. In scenario 602, while user 601 is waiting on the line, smart card 100/200 determines it is within range of a communication channel of ATM 607. Smart card 100/200 establishes communication channel 621 with ATM 607. In response to establishing communication channel 621, microprocessor 309 (shown in FIG. 3) unlocks keypad 105/205. At shown in 617, user 601 may remove smart card 100/200 and enter transaction information while waiting for users 603 and 605 to complete their transactions at ATM 607.

Enlarged view 619 shows illustrative transaction information 615 entered by user 601 while waiting on the line. Using unlocked keypad 105/205, user 601 has entered an amount −$345. Using unlocked keypad 105/205, user 601 has also entered a PIN. The PIN is represented by "xxxx" to prevent an onlooker from viewing the PIN entered by user 601.

Transaction information 615 may be transferred to ATM 607 while user 601 is waiting on the line. Based on the entered transaction information, smart card 100/200 may formulate transaction instructions executable by ATM 607. When user 601 inserts smart card 100/200 into ATM 607, transaction information 615 previously entered by user 601 is used to execute a transaction at ATM 607. The transaction may be executed without requiring any inputs from user 601 after smart card 100/200 was inserted into ATM 607.

Executing transactions based on transaction information 615 previously entered by user 601 may increase a transaction efficiency of ATM 607. For example, each of users 603 and 605 may be in possession of a smart card such as smart card 100/200. Each of users 603 and 605 may enter transaction information using keypad 105/205 before approaching ATM 607.

Based on the previously entered transaction information, transactions desired by each of users 603 and 605 may be executed by ATM 607. The desired transactions may be executed without requiring any additional prompts or inputs from users 603 or 605 after their respective smart cards are inserted into ATM 607.

As a result of not having to prompt users 601, 603 or 605 for information, ATM 607 may process transactions desired by users 601, 603 or 605 in less time. Accordingly, users 601, 603 or 605 each wait less time on the line before having their desired transactions executed by ATM 607.

Figure 7:
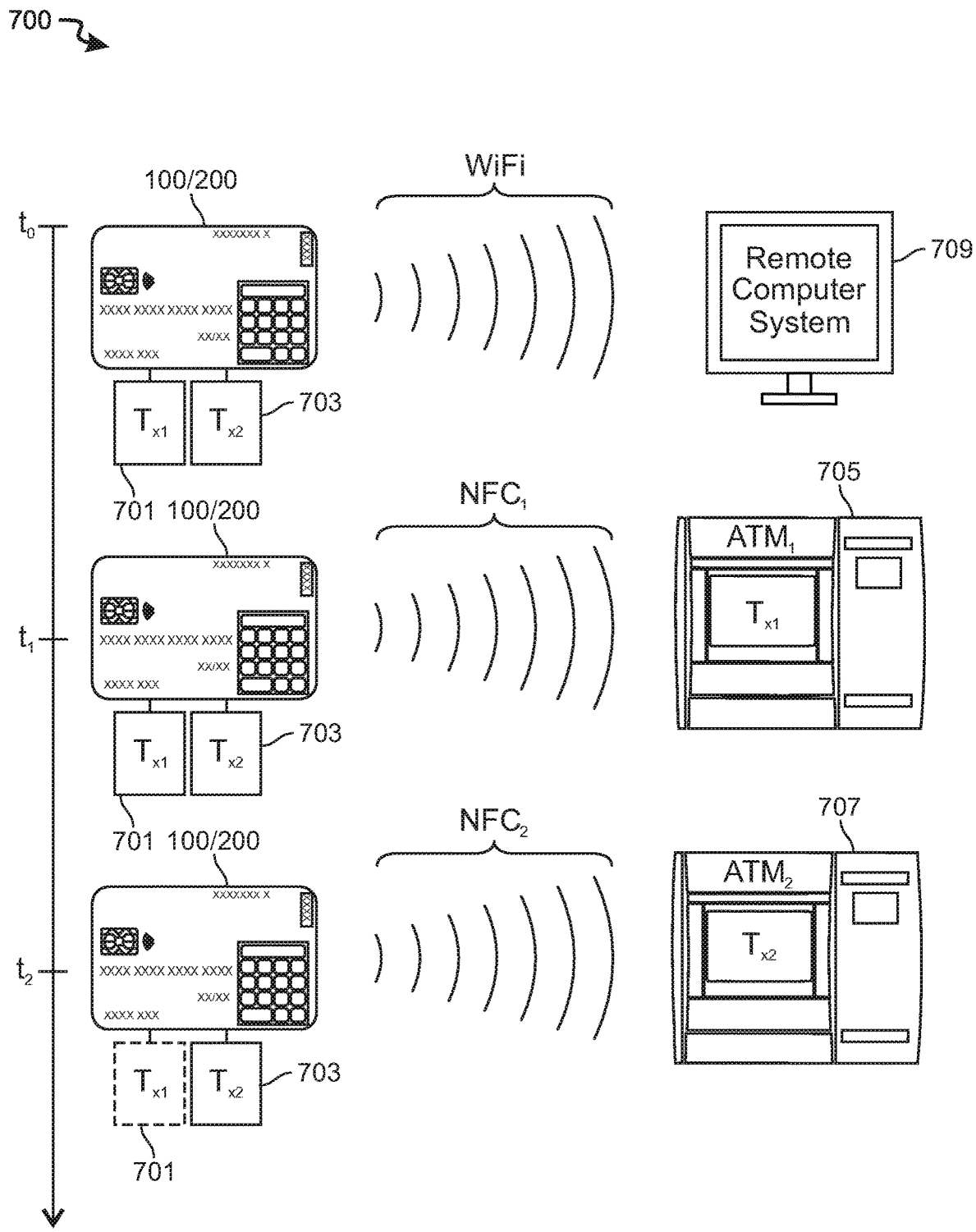
FIG. 7 shows an illustrative apparatus and scenario in accordance with principles of the disclosure.

FIG. 7 shows illustrative scenario 700. In scenario 700, at time $t_0$, two sets of transaction instructions 701 and 703 are stored locally on smart card 100/200. Each of transaction instructions 701 and 703 may have formulated based on transaction information input by a user of smart card 100/200 using keypad 105/205. Each of transaction instructions 701 and 703 may be associated with timing restrictions. Each of transaction instructions 701 and 703 may be associated with location restrictions. For example, the user may limit transaction instructions 701 to being executed at $t_1$ at ATM 705. The user may limit transaction instructions 703 to being executed at $t_2$ at ATM 707.

Scenario 700 shows that at $t_0$, transaction instructions 701 and 702 may be validated by remote computer system 709. For example, using a Wi-Fi communication channel, remote computer system 709 may prompt for a PIN or biometric feature. The Wi-Fi communication channel may be a long-range communication channel.

Remote computer system 709 may confirm that the provided PIN or biometric feature included in transaction instructions 701 or 702 is in fact associated with smart card 100/200. After successfully validating transactions instructions 701 and 703, remote computer system 709 may authorize smart card 100/200 to transmit transaction instructions 701 and 703 to one or more ATMs. Transmitting transaction instructions 701 and 703 to an ATM may autonomously trigger execution of a transaction at the ATM.

Scenario 700 shows that at $t_1$, transaction 701 is transferred to ATM 705 via $NFC_1$ communication channel. $NFC_1$ communication channel may be a short-range communication channel. Transferring transaction instructions 701 to ATM 705 may autonomously trigger execution of transaction instructions 701 at ATM 705. A user of smart card 100/200 may initiate the transfer of transaction instructions 701 to ATM 705 by actuating a target key (e.g., target key 207, shown in FIG. 2) of smart card 100/200.

Scenario 700 shows that at $t_2$, transaction instructions 703 are transferred to ATM 707 via $NFC_2$ communication channel. $NFC_2$ communication channel may be a short-range communication channel. At $t_2$, because transaction instructions 701 have previously been transferred to ATM 705 at $t_1$, transaction instructions 701 are shown in phantom lines.

In some embodiments, transaction instructions 701 may be deleted from smart card 100/200 after being transferred to ATM 705. For example, ATM 705 or remote computer system 709 may issue an instruction to smart card 100/200 to delete transaction instructions 701 after they are successfully executed by ATM 705.

Thus, methods and apparatus for a DUAL COMMUNICATION CHANNEL SMART CARD are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for improving transaction processing efficiency of an Automated Teller Machine ("ATM"), the system comprising a smart card having a thickness not greater than 0.8 mm and a surface area not greater than 86 mm×54 mm and comprising:
   a short-range wireless communication interface;
   a long-range wireless communication interface;
   a microprocessor;
   a user input system in electronic communication with the microprocessor, the user input system comprising:
      a mechanical keypad;
      an input controller that captures data entered using the keypad;
      a voice controller that generates an audio message based on the data captured by the input controller; and
      an encryption controller that encrypts the data captured by the input controller; and
   executable instructions stored in a non-transitory memory, that when run by the microprocessor:
      establish an authentication communication channel with the ATM using the long-range communication interface;
      self-authenticate the smart card to the ATM using the long-range communication interface;
      establish a secure wireless communication link with the ATM using the short-range communication interface; and
      trigger execution of a transaction at the ATM by transferring the encrypted data to the ATM using the short-range communication interface, thereby improving the transaction processing efficiency of the ATM.

2. The system of claim 1 wherein the keypad comprises mechanical keys and each mechanical key comprises a braille descriptor.

3. The system of claim 1 wherein:
   the transaction is a first transaction;
   the ATM is a first ATM; and
   the executable instructions stored in a non-transitory memory, that when run by the microprocessor are configured to:
      store the first transaction and a second transaction locally on the smart card;
      trigger execution of the first transaction at the first ATM; and
      trigger execution of the second transaction at a second ATM after the first transaction is executed by the first ATM.

4. The system of claim 3, wherein:
   the first transaction is triggered by transferring a first set of transaction instructions to the first ATM using the short-range communication interface; and
   the second transaction is triggered by transferring a second set of transaction instructions to the second ATM using the short-range communication interface.

5. The system of claim 3, wherein:
   the first transaction is triggered by transferring a first set of transaction instructions to the first ATM using the long-range communication interface; and
   the second transaction is triggered by transferring a second set of transaction instructions to the second ATM using the short-range communication interface.

6. The system of claim 1 wherein the executable instructions stored in a non-transitory memory, when run by the microprocessor delete the encrypted data when the ATM does not establish the secure wireless communication link with the ATM using the short-range communication interface within a pre-determined time period.

7. The system of claim 1, wherein the ATM comprises:
   a front controller that receives the encrypted data over the secure wireless communication link using the short-range communication interface;
   a decryption controller that decrypts the encrypted data;
   an input validation controller that communicates with a remote computer server and validates the encrypted data; and
   a payment dispatcher that dispenses cash in response to a positive validation received from the input validation controller.

8. A smart card that improves transaction processing efficiency of an Automated Teller Machine ("ATM"), the smart card comprising:
   a wireless communication interface;
   a contact-based communication interface;
   a housing;
   a microprocessor embedded in the housing;
   a battery for powering the communication interface and the microprocessor;
   a keypad mounted on an outside of the housing; and
   executable instructions stored in a non-transitory memory, that when run by the microprocessor:
      capture data entered using the keypad;
      encrypt the captured data;
      formulate a set of transaction instructions executable by the ATM based on the captured data;
      in response to detecting a contact-based ATM communication channel initiated by the ATM, authenticate the smart card to the ATM over the contact-based ATM communication channel;
      in response to the authentication, activate the wireless communication interface and scan for a wireless ATM communication channel; and
      transmit the transaction instructions to the ATM over the wireless ATM communication channel and trigger execution of the set of transaction instructions at the ATM without requiring any user input after formulating the transaction instructions, thereby improving the transaction processing efficiency of the ATM.

9. The smart card of claim 8, wherein the data entered using the keypad and encrypted by the microprocessor comprises:
   a personal identification number ("PIN") associated with the smart card; and
   an amount of cash desired to be withdrawn from the ATM.

10. The smart card of claim 8 further comprising a voice controller; and
   the executable instructions stored in the non-transitory memory, when run by the microprocessor:
      before activating the wireless communication interface, generate an audio message based on the formulated transaction instructions; and
      wait for actuation of a target key on the keypad before activating the wireless ATM communication channel.

11. The smart card of claim 10, wherein the executable instructions stored in the non-transitory memory, when run by the microprocessor randomly assign a key on the keypad as the target key.

12. The smart card of claim 8 wherein each key on the keypad comprises a braille key descriptor.

13. The smart card of claim 8, wherein, the smart card is not capable of transmitting the transaction instructions to the ATM over the contact-based ATM communication channel.

14. The smart card of claim 8, wherein the housing and the keypad collectively have a thickness that is not greater than 0.8 millimeters ("mm").

15. The smart card of claim 11, wherein the battery is recharged when the smart card is in communication with the ATM via the wireless ATM communication channel.

16. The smart card of claim 8, wherein:
the wireless communication interface comprises:
an inactive state in which the wireless communication interface is unable to transmit data; and
an active state in which the wireless communication interface is capable of transmitting data; and
the microprocessor toggles the communication interface from the inactive state to the active state in response to detecting actuation of a target key on keypad.

* * * * *